United States Patent
Berggren et al.

(10) Patent No.: US 10,993,149 B2
(45) Date of Patent: Apr. 27, 2021

(54) OPERATING A TERMINAL DEVICE IN A CELLULAR MOBILE COMMUNICATION NETWORK

(71) Applicants: Sony Mobile Communications Inc., Tokyo (JP); Sony Corporation, Tokyo (JP)

(72) Inventors: Anders Berggren, Lund (SE); Brian Alexander Martin, Weybridge (GB)

(73) Assignee: Sony Corporation, Tokyo (JP)

( * ) Notice: Subject to any disclaimer, the term of this patent is extended or adjusted under 35 U.S.C. 154(b) by 144 days.

(21) Appl. No.: 16/302,796

(22) PCT Filed: May 23, 2016

(86) PCT No.: PCT/EP2016/061585
§ 371 (c)(1),
(2) Date: Nov. 19, 2018

(87) PCT Pub. No.: WO2017/202044
PCT Pub. Date: Nov. 30, 2017

(65) Prior Publication Data
US 2019/0306759 A1    Oct. 3, 2019

(51) Int. Cl.
*H04W 88/06* (2009.01)
*H04W 36/00* (2009.01)
(Continued)

(52) U.S. Cl.
CPC ... *H04W 36/0022* (2013.01); *H04W 52/0229* (2013.01); *H04W 76/16* (2018.02); *H04W 76/27* (2018.02); *H04W 88/06* (2013.01)

(58) Field of Classification Search
None
See application file for complete search history.

(56) References Cited

U.S. PATENT DOCUMENTS

| | | | |
|---|---|---|---|
| 7,545,787 B2 * | 6/2009 | Bitran | H04W 88/06 370/277 |
| 2013/0244673 A1 * | 9/2013 | Anand | H04W 48/16 455/450 |

(Continued)

OTHER PUBLICATIONS

International Search Report and Written Opinion from counterpart International Patent Application No. PCT/EP2016/061585, dated Dec. 7, 2016, 9 pages.

*Primary Examiner* — Ajit Patel
(74) *Attorney, Agent, or Firm* — Tucker Ellis, LLP

(57) ABSTRACT

The present application relates to a method for operating a terminal device (17) in a cellular mobile communication network (10). The cellular mobile communication network (10) comprises a first base station (11) using a first radio resource, and a second base station (12, 13) using a second radio resource. The terminal device (17) comprises a first transceiver unit (25) for communicating via the first radio resource and a second transceiver unit (26) for communicating via the second radio resource. According to the method, a radio resource control information for the second radio resource is determined and received at the terminal device (17) via the first transceiver unit (25). As defined by the radio resource control information, user data communication (19) between the second base station (12) enter the terminal device (17) is established via the second transceiver unit (26). The first transceiver unit (25) is set in an idle mode.

11 Claims, 2 Drawing Sheets

(51) Int. Cl.
*H04W 76/16* (2018.01)
*H04W 76/27* (2018.01)
*H04W 52/02* (2009.01)

(56) References Cited

U.S. PATENT DOCUMENTS

2015/0063295 A1 3/2015 Himayat
2016/0056931 A1 2/2016 Fan

* cited by examiner

OPERATING A TERMINAL DEVICE IN A CELLULAR MOBILE COMMUNICATION NETWORK

FIELD OF THE INVENTION

The present invention relates to a method for operating a terminal device in a cellular mobile communication network, in particular in a cellular mobile communication network which supports two different communication technologies.

BACKGROUND OF THE INVENTION

The popularity of mobile data and voice communication continues to grow. The increasing popularity of data and voice communication requires increasing data transmission performance. For increasing data transmission performance, new transmission and communication technologies and new frequency ranges may be used. However, such new technologies may be available in certain areas only and it may take several years until a sufficient coverage with the new technologies is reached. In the meantime, communication devices may support two or even more technologies. The communication devices may comprise so-called terminal devices or user equipment devices like mobile telephones, mobile computers, tablet computers, wearable devices, mobile accessories, or robotic devices.

However, when a communication device supports two or more communication technologies at the same time, a power consumption may increase and an operating time of a mobile battery-powered device may be reduced.

SUMMARY OF THE INVENTION

In view of the above, there is a need in the art for methods and devices which enable and improve an efficient operation of communication devices in the above described communication environments where at least two different communication technologies may be present.

According to the present invention, this object is achieved by the features of the independent claims. The dependent claims define embodiments of the invention.

According to the present invention, a method for operating a terminal device in a cellular mobile communication network is provided. The cellular mobile communication network comprises at least one first base station using a first radio resource and at least one second base station using a second radio resource.

The first and second radio resources may be different. For example, the first radio resource may comprise a transmission frequency range which is different from a transmission frequency range of the second radio resource.

The terminal device comprises a first transceiver unit for communicating via the first radio resource and a second transceiver unit for communicating via the second radio resource. For example, the terminal device may comprise a user equipment like a mobile telephone, a mobile computer, a tablet computer, a wearable device, a mobile accessory, or a robotic device. A wearable device or a mobile accessory, also called smart mobile accessory or smart wearable device, may comprise a wearable computer, also known as body born computer or simply wearable, which is a miniature electronic device that may be worn by the user under, with or on top of clothing.

For example, the first transceiver unit may operate according to a first radio access technology, for example a 4G LTE technology. The first radio resource may comprise radio frequency bands and coding technologies of the first radio access technology. The second transceiver unit may operate according to a second radio access technology, for example a 5G technology. The second radio resource may comprise radio frequency bands and coding technologies of the second radio access technology.

According to the method, a radio resource control information for the second radio resource is determined. The radio resource control information may comprise information concerning a frequency band, a coding scheme and the like for specifying transmission parameters for the communication between the terminal device and the second base station. The radio resource control information for the second radio resource is received at the terminal device via the first transceiver unit. A user data communication between the second base station and the terminal device is established via the second transceiver unit. The user data communication between the second base station and the terminal device is established as defined by the radio resource control information. Finally, the first transceiver unit is set in an idle mode.

For example, the first base station may comprise a base station working according to the fourth generation communication standards, the so-called 4G LTE (long-term evolution). The second base station may comprise a base station working according to the fifth generation communication standards, the so-called 5G new RAT (new radio access technology). By providing the radio resource control information for the second radio resource of the new RAT via the first base station and the first transceiver unit of the terminal device, the starting point for a communication setup may always rely on the existing 4G LTE communication. After the radio resource control information for the second radio resource has been transmitted via the first transceiver unit of the terminal device, the first transceiver unit may be set in the idle mode to save electrical energy at the terminal device.

The idle mode may comprise for example a deactivated mode, in which the first transceiver unit is continuously deactivated.

As an alternative, the idle mode may comprise a suspended mode, in which information relating to a radio connection via the first radio resource is stored in the first transceiver unit. Furthermore, the first transceiver unit is deactivated apart from receiving paging information from the first base station. The stored information is reused when leaving the idle mode.

Furthermore, as an alternative, the idle mode may comprise a semi-connected mode, in which information relating to a radio connection via the first radio resource is stored in the first transceiver unit, and the first transceiver unit is periodically activated and deactivated. The stored information is reused when the first transceiver unit is activated.

Although, in the above described idle mode embodiments the first transceiver unit is at least partially activated, a considerable amount of electrical power may be saved, as only the receiving part may be active and only a small set of received information has to be processed.

Setting the first transceiver unit in the idle mode may comprise additionally setting a corresponding radio resource control unit in an idle mode for saving processing power and therefore saving electrical energy.

According to an embodiment, the first transceiver unit is set into the idle mode after a predetermined time of communication inactivity between the first base station and the terminal device has elapsed. The time of communication inactivity to set into the idle mode may comprise for example a value in a range of a few seconds, for example 5 to 10 seconds. The time of communication inactivity may be monitored by the terminal device such that the trigger for entering the idle mode may be generated by the terminal device itself.

Additionally or as an alternative, the first transceiver unit is set into the idle mode upon establishing the user data communication between the second base station and the terminal device. This may be determined by the terminal device after the user data communication between the second base station and the terminal device is reliably established.

In particular, the terminal device may enter the idle mode without the normal procedure for releasing the radio resource control connection initiated by the first base station.

Additionally or as an alternative, the first transceiver unit is set into the idle mode upon receiving an inactivity request from the first base station. For example, the first base station may recognize that no data communication is requested between the terminal device and the first base station. This may be determined based on a monitoring of the communication between the first base station and the terminal device, or based on information from the second base station which indicates that a corresponding user data communication has been established and no further user data communication via the first base station is requested.

Furthermore, the terminal device may sent a request to the first base station to release the radio resource control connection. The request may be sent via upper layers of a communication between the terminal device and first base station. Upon this request, the first base station may initiate a procedure for releasing the radio resource control connection, and the terminal device may enter the idle mode.

Further information may be additionally considered for setting the first transceiver unit into the idle mode. For example, a moving state of the terminal device may be considered, and the idle mode may be entered only in case the terminal device is not moving for at least a predetermined amount of time, for example for a few seconds.

According to another embodiment, the radio resource control information for the second radio resource is determined by the first base station and transmitted from the first base station to the terminal device via the first radio resource. A radio resource control functionality of the first base station may be configured to manage the radio resource control for the first radio resource as well as for the second radio resource. Depending on the requested transmission performance, for example requested by an application of the terminal device, the first base station may select the first radio resource or the second radio resource. Corresponding radio resource control information may be determined and transmitted to the terminal device.

According to another embodiment, the radio resource control information for the second radio resource is determined by the second base station. The radio resource control information is transmitted from the second base station via the first base station to the terminal device via the first radio resource. While determining and transmitting the radio resource control information for the second radio resource via the first radio resource, the second transceiver unit of the terminal device may be deactivated for power saving.

According to an embodiment, the method comprises furthermore to determine a state of a radio transmission between the second base station and the terminal device. Depending on the state of the radio transmission between the second base station and the terminal device, the first transceiver unit is set in an active mode. Thus, for example in case the radio transmission between the second base station and the terminal device via the second radio resource degrades, the first transceiver unit is activated such that updated radio resource control information for the second radio resource may be determined and received at the terminal device for improving the radio transmission between the second base station and the terminal device.

For example, a quality information relating to the radio transmission between the second base station and the terminal device may be determined. The quality information may relate for example to a signal-to-noise ratio or a bit error rate. The first transceiver unit may be set into the active mode, if predefined thresholds for the signal-to-noise ratio or the bit error rate are exceeded. Additionally or as an alternative, a mobility event of the mobile terminal device may be determined and the first transceiver unit may be set into the active mode when the terminal device has been moved. A movement of the terminal device may change the radio characteristics between the second base station and the terminal device and a degradation of the radio transmission may be expected in this case.

The state of the radio transmission between the second base station and the terminal device may be determined by the terminal device. For example, the terminal device may monitor the quality of the received user data or the terminal device may provide sensors for determining the movement of the terminal device, for example an acceleration sensor. Based on this information, the terminal device may activate the first transceiver unit such that a radio resource control information may be received from the first base station to improve the radio communication between the second base station and the terminal device.

Additionally or as an alternative, the state of the radio transmission between the base station and the terminal device may be determined by the second base station. The second base station may monitor for example the above described quality parameters like signal-to-noise ratio or bit error rates. The second base station may transmit its observations to the terminal device via the second radio resource, for example via specific protocol data units. The terminal device may activate the first transceiver unit depending on the state of the radio transmission received from the second base station. Therefore, even in case only the uplink communication is disturbed, the first transceiver unit is reliably activated and new radio resource control information may be determined and received at the terminal device for improving the data communication between the second base station and the terminal device.

Furthermore, as another alternative, the state of the radio transmission between the second base station and the terminal device may be determined by the second base station and may be transmitted to the first base station, for example via a direct interface or link between the second base station and the first base station. Based on the state of the radio transmission between the second base station and the terminal device received from the second base station, the first base station may transmit a wake-up information to the terminal device for setting the first transceiver unit into the active mode. The wake-up information may comprise for example a connect request or a paging signal.

Furthermore, according to the present invention, a terminal device for use in a cellular mobile communication network is provided. The cellular mobile communication network comprises at least one first base station using a first radio resource and at least one second base station using a second radio resource. The terminal device comprises a first transceiver unit for communicating via the first radio resource, and a second transceiver unit for communicating via the second radio resource. The terminal device comprises furthermore a processing unit which is configured to receive, via the first transceiver unit, a radio resource control information determined for the second radio resource. The processing unit establishes a user data communication between the second base station and the terminal device via the second transceiver unit as defined by the radio resource control information. Finally, the processing unit sets the first transceiver unit in an idle mode.

The terminal device is therefore configured to perform the above-described method and embodiments thereof and comprises therefore also the above-described advantages.

According to the present invention, a base station for use in a cellular mobile communication network is provided. The cellular mobile communication network comprises the base station which operates as a first base station using a first radio resource. The mobile communication network comprises furthermore at least one second base station using a second radio resource, and the mobile communication network comprises a terminal device. The base station comprises a transceiver unit for communicating with the terminal device via the first radio resource, and a processing unit which is configured to determine a radio resource control information for the second radio resource and to transmit the radio resource control information for the second radio resource via the transceiver unit to the terminal device. The base station is therefore configured to execute the above-described method and embodiments thereof as the first base station and comprises therefore the above described advantages.

Finally, according to the present invention, a base station for use in a cellular mobile communication network is provided. The cellular mobile communication network comprises the base station operating as a second base station using the second radio resource, and at least one first base station using the first radio resource. The cellular mobile communication network comprises furthermore a terminal device. The base station comprises a transceiver unit for communicating with the terminal device via the second radio resource, and a processing unit configured to establish a user data communication between the second base station and the terminal device as defined by a radio resource control information which is related to the second radio resource. The terminal device received the radio resource control information from the first base station via the first radio resource. Furthermore, the processing unit is configured to execute the above-described method as the second base station.

Although specific features described in the above summary and the following detailed description are described in connection with specific embodiments and aspects of the present invention, it should be noticed that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF PREFERRED EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise. Same reference signs in the various drawings refer to similar or identical components.

Figure 1:
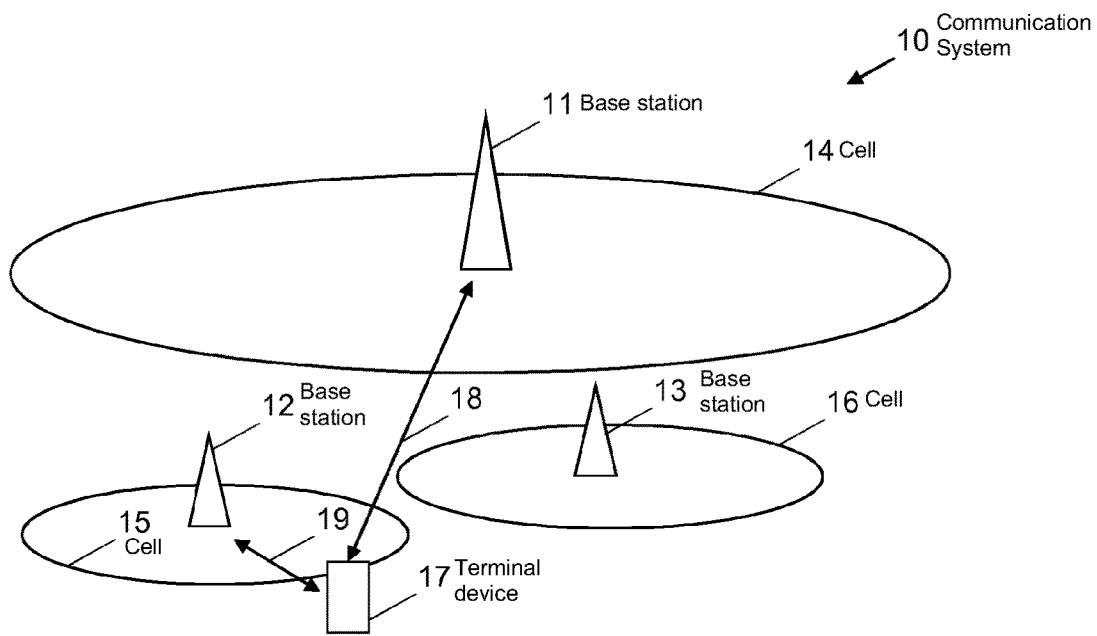
FIG. 1 shows schematically a cellular mobile communication network comprising base stations and a terminal device according to embodiments of the present invention.

FIG. 1 shows schematically a wireless cellular communication system 10 comprising three base stations 11 to 13. Base station 11 may communicate with mobile devices located within a cell 14. Base station 12 may communicate with mobile devices located within a cell 15, and base station 13 may communicate with mobile devices located within a cell 16. Base station 11 may comprise for example a base station operating according to the fourth generation long-term evolution (4G LTE) standards for wireless communication. The base stations 12 and 13 may comprise for example base stations operating according to the fifth generation mobile networks (5G). 4G and 5G networks may differ in the used frequency bands, supported bandwidth and coding technologies. For example, 4G LTE based systems may operate in a frequency range of up to 10 GHz providing a bandwidth of for example up to 100 MHz, or may operate in a frequency range of 10 to 30 GHz providing a bandwidth from 100 to 1000 MHz, whereas 5G systems may operate in the frequency range above 30 GHz providing a bandwidth of more than 1000 MHz. Therefore, the underlying physical connection methods for 4G and 5G the radio-based communication networks, the so-called radio access technologies (RAT), may also be different.

A terminal device 17 provided in the wireless cellular communication system 10 may take advantage of both available communication standards. For example, depending on required transmission performance, the terminal device 17 may communicate via a communication link 18 with the base station 11 or via communication link 19 with the base station 12. In other scenarios, when the terminal device 17 is moving closer to the base station 13, the terminal device 17 may communicate via a corresponding communication link with the base station 13 instead of communicating with the base station 12.

The terminal device 17 is also called user equipment and may comprise for example a mobile telephone, a tablet computer, a wearable device or a mobile accessory. Furthermore, the terminal device 17 may comprise for example a stationary or mobile station like a cash register, a credit card reader, a control device for a home or office automation system, a robotic device, a drone, or a moving cell in for example a vehicle. Although FIG. 1 shows only one terminal device 17, in the communication system 10 a plurality of terminal devices may be arranged and may be configured to communicate with one or more of the base stations 11 to 13.

In the claims, the 4G base station 11 is called first base station, and the 5G base stations 12, 13 are called second base stations.

When two generations of communication systems are available, the terminal device 17 may have to be enabled to cooperate with both systems. Likewise, this is required during migration from one generation to the next generation.

Additionally, such a cooperation or migration may also be supported by the base stations 11 to 13. For example, in 4G LTE a concept is defined called dual connectivity, where a secondary base station is connected to a master base station. The secondary base station may comprise for example a 5G base station and the master base station may comprise for example a 4G LTE base station. Such a concept may be used for transmitting radio access technology (RAT) information of the 5G system via the 4G system. In the following, RAT information concerning the 4G LTE network will be called LTE RAT, and RAT information concerning the 5G network will be called new RAT or NR.

In wireless cellular communication systems like 4G LTE, the management of radio resources is performed in a so-called control plane by functionalities called radio resource management (RRM) and radio resource control (RRC). For accomplishing the above described communication of the new RAT information of the 5G system via the 4G system, a common RRC entity in the 4G base station may be used (single RRC concept), or two separate RRC entities may be used (dual RRC concept), one in the 4G base station and the other in the 5G base station.

In the single RRC concept a single entity of RRC generates the final RRC messages to be sent towards the terminal device. There is a single RRC entity visible to the terminal device RRC entity, where it receives all messages from that entity and replies back to it. A coordination of RRM functions between new RAT and LTE RAT is required.

In the dual RRC concept two separate RRC entities can generate RRC messages to be sent towards the terminal device via the LTE base station.

However, independent from the single or dual RRC concept, the LTE RRC may be the anchor and may handle all main RRC activities like broadcast of system information, paging, setting up RRC connection and signalling radio bearers, handling the LTE side non-access stratum (NAS) functionality, the setup of the packet data network (PDN) connection for user plane traffic, and configuration of new RAT to establish a connection to the 5G base station and to initiate user plane traffic. The new RAT RRC, which may be implemented as an own 5G RRC entity or integrated into the 4G RRC, may handle for example initiating a connection for the new RAT based on a request from LTE, configuring lower layers to handle user plane traffic based on a request from LTE, and simple radio measurements.

Figure 2:
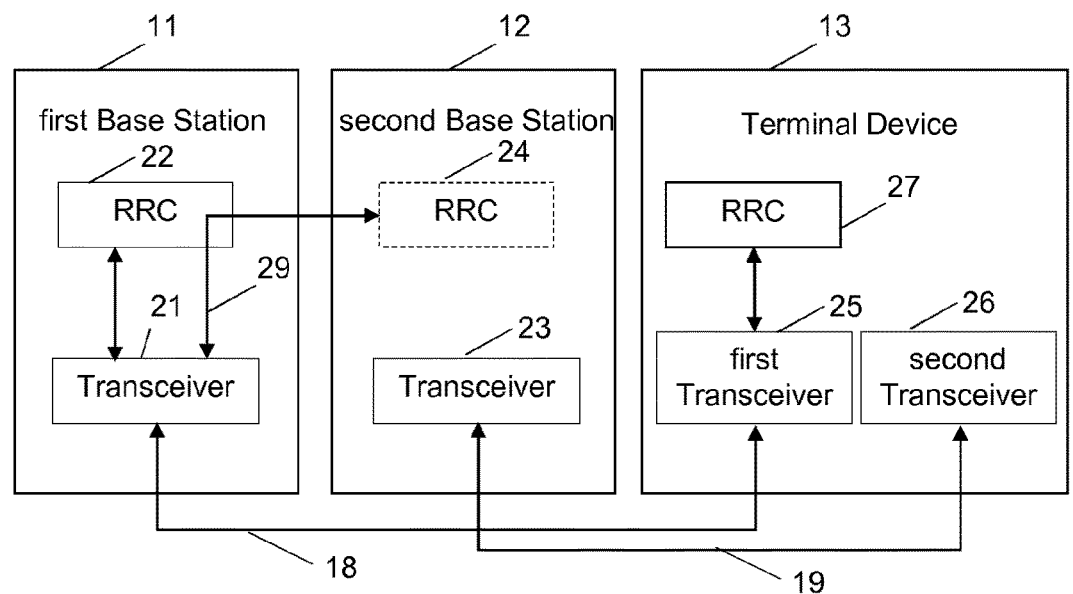
FIG. 2 shows schematically a more detailed view of base stations and the terminal device according to embodiments of the present invention.

The communication structure between the LTE base station 11, the 5G base station 12 and the terminal device 17 is shown schematically in more detail in FIG. 2.

The LTE or first base station 11 comprises a transceiver 21 and an RRC entity 22. The RRC entity 22 may be implemented as software executed by a processing unit of the base station 11. The transceiver 21 may comprise hardware and software for providing lower layers of a protocol stack. The 5G or second base station 12 comprises likewise a transceiver 23 and an RRC entity 24. The RRC entity 24 is drawn as dashed box to indicate that it may comprise a reduced functionality only, or that it may be implemented as part of the RRC entity 22 of the LTE base station 11. However, the RRC entity 24 communicates as indicated by arrow 29 via the transceiver 21 of the 4G base station 11 with the terminal device 17. The terminal device 17 comprises a first transceiver 25 for communicating via the communication link 18 with the 4G base station 11, and a second transceiver 26 for communicating via communication link 19 with the 5G base station 12. Furthermore, the terminal device 17 comprises an RRC entity 27 supporting the LTE RAT as well as the new RAT.

Figure 3:
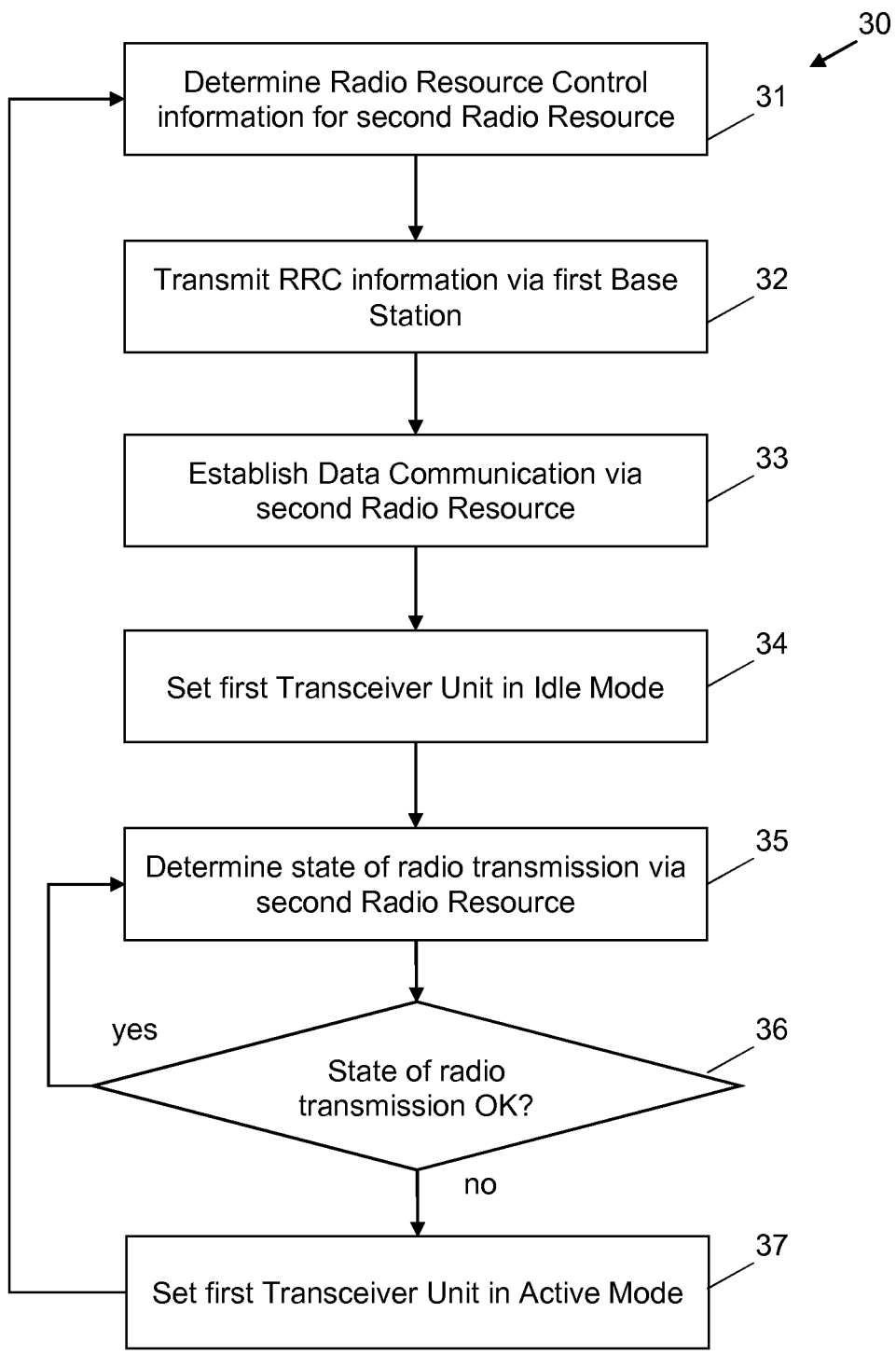
FIG. 3 shows a flowchart comprising method steps according to an embodiment of the present invention.

Operation of the terminal device 17 in the communication system 10 will be described in more detail with reference to FIG. 3 which shows a flowchart comprising method steps 31 to 37 of a method 30.

As described above, LTE may be preferably be the anchor for managing the available radio resources of the 4G and 5G systems. However, the new RAT might be preferred from the user data point of view allowing higher data rates. The new RAT may be used for user plane traffic, whereas LTE handles the control plane. Therefore, in step 31 radio resource control information is determined for the 5G radio resources, i.e. the new RAT. In the claims and in FIG. 3, the radio resources of the 5G system are named second radio resource. The RRC information concerning the new RAT are transmitted via the 4G base station 11 to the terminal device 17 in step 32. Based on the RRC information a data communication 19 is established in step 33 between the terminal device 17 and the 5G base station 12. The data communication 19 uses the radio resources defined in the new RAT. In case the terminal device is stationary and radio conditions can be regarded as stable, the LTE RRC part may enter idle mode in step 34, for example by setting the first transceiver unit 25 into idle mode, while user plane traffic is still ongoing over new RAT and the second transceiver 26. This may save electrical energy at the terminal device 17, which may be battery-powered, and therefore an operating time of the terminal device 17 may be increased.

As long as user plane traffic is ongoing and the radio environment is stable, the LTE side may remain in idle. Therefore, in step 35, a state of the radio transmission via the new RAT is determined and in step 36 is decided, whether the radio transmission is stable or not. In case the radio transmission is stable, the method may be continued in step 35 for further monitoring, whereas in unstable conditions the LTE RRC part may return into active mode by activating the first transceiver unit 25 in step 37. For example, in case the radio environment worsens, an indication may be sent to wake-up the LTE side to trigger a potential reconfiguration or even change of cell. The LTE side may then first instruct the new RAT to perform additional radio measurements in order for the LTE side to take a decision on whether to potentially move user plane traffic to LTE side, or whether to reselect to another 4G base station, or to another 5G base station. After leaving the idle mode in step 37, the method continues in step 31 with adjusting the radio transmission via the new RAT.

The LTE idle mode state could either be fully idle or it could be suspended or semi-connected. The term suspended in relation to an RRC connection may mean storing a context relating to the RRC connection or storing RRC connection data and one or more of:

- inhibiting the transmission of LTE user plane data between the terminal device and the LTE base station, but the terminal device is still able to receive paging from the LTE base station or to receive notifications of downlink data from the LTE base station;
- the LTE base station may instruct the terminal device to perform functions, for example paging and mobility procedures that may differ from those used in a normal or non-suspended RRC connected mode, that are the same as or similar to idle mode functions; and
- releasing the air interface or radio links or radio resources associated with the RRC connection between the LTE base station and the terminal device, but the terminal device is still able to receive paging from the LTE base station or to receive notifications of downlink data from the LTE base station.

When the user plane traffic via new RAT is ending, the LTE side may be informed about this and any potential context related to the new RAT side, for example security parameters, may be removed.

For determining a worsening state of the radio transmission via the new RAT, at least one of the following alternatives may be realized.

In case of the above-described single RRC concept, some logic in the new RAT user plane side may be provided to handle some basic measurement functionality, for example intra-cell only, to be forwarded to the RRC entity on the LTE side in the terminal device. This measurement may relate for example to lower layer parameters like a signal-to-noise ratio or to bit error rates or frame error rates of received user data. The measurement may either be initiated by LTE RRC or, in case the LTE RRC is an idle mode, trigger events for performing these measurements may be provided based on defined criteria, for example controlled by a timer or a movement of the terminal device. For example, user plane communication via the second receiver 26 maybe monitored and based on this a wake-up of the RRC entity 27 and the first transceiver 25 may be initiated.

Thus, in case the new RAT site of the terminal device 17 is performing measurements, there may be a possibility to send an indication to the LTE side, for example by a special bit or a message from the new RAT side to the LTE side, that will wake up the LTE side to do a RRC connection establishment.

Furthermore, there may be cases in which the network requires to trigger the terminal device to leave the idle mode for the RRC, that means that the network requires to enter a connected mode for example to trigger a reconfiguration, initiate a new service, or release the terminal device. This may be accomplished by paging the terminal device. However, the paging overhead may be reduced by sending a command in the user plane via the new RAT, for example using an indication in a lower layer (for example in the media access control (MAC) header or the radio link control (RLC) header), or by sending an explicit command such as a specific wake-up. In response to receiving the command in the new RAT, the terminal device may leave the idle mode of the LTE RRC to receive control plane reconfigurations.

Likewise, the 5G base station 12 may perform measurements concerning the transmission quality of the transmission link 19 and may transmit the results by sending a command in the user plane via the new RAT to the terminal device 17. Upon receiving the command from the 5G base station 12, the terminal device 17 may trigger that the RRC entity 27 as well as the first transceiver 25 leave the idle mode and reconnect to the 4G base station 11 for adjusting communication.

The invention claimed is:

1. A method for operating a terminal device in a cellular mobile communication network, the cellular mobile communication network comprising at least one first base station using a first radio resource, and at least one second base station using a second radio resource, the terminal device comprising a first transceiver for communicating via the first radio resource and a second transceiver for communicating via the second radio resource, the method comprising:
   determining a radio resource control information for the second radio resource,
   receiving, at the terminal device, the radio resource control information for the second radio resource via the first transceiver,
   establishing, via the second transceiver, a user data communication between the second base station and the terminal device as defined by the radio resource control information,
   setting the first transceiver in an idle mode subsequent to at least receiving the radio resource control information,
   determining a state of a radio transmission between the second base station and terminal device wherein determining the state of the radio transmission comprises at least one of:
      determining a quality information relating to the radio transmission between the second base station and terminal device, and
      determining a mobility event of the terminal device, and
   setting the first transceiver in an active mode depending on the state of the radio transmission between the second base station and terminal device.

2. The method according to claim 1, wherein the step of setting the first transceiver in the idle mode comprises at least one of:
   setting the first transceiver in the idle mode after a predetermined time of communication inactivity between the first base station and terminal device,
   setting the first transceiver in the idle mode upon receiving an inactivity request from the first base station, and
   setting the first transceiver in the idle mode upon establishing the user data communication between the second base station and terminal device.

3. The method according to claim 1, wherein the first radio resource comprises a transmission frequency range which is different than a transmission frequency range of the second radio resource.

4. The method according to claim 1, wherein the radio resource control information is determined by the first base station and transmitted from the first base station to the terminal device via the first radio resource.

5. The method according to claim 1, wherein the radio resource control information is determined by the second base station, transmitted from the second base station via the first base station to the terminal device via the first radio resource.

6. The method according to claim 1, wherein the state of the radio transmission between the second base station and terminal device is determined by the terminal device.

7. The method according to claim 1, wherein the state of the radio transmission between the second base station and terminal device is determined by the second base station and transmitted to the terminal device via the second radio resource.

8. The method according to claim 1, wherein the state of the radio transmission between the second base station and terminal device is determined by the second base station and transmitted to the first base station.

9. The method according to claim 1, wherein setting the first transceiver in the active mode comprises receiving a connect request at the first transceiver from the first base station.

10. The method according to claim 1, wherein the idle mode comprises at least one of:
   a deactivated mode, in which the first transceiver is continuously deactivated,
   a suspended mode, in which information relating to a radio connection via the first radio resource is stored and the first transceiver is deactivated apart from receiving paging information from the first base station, wherein the stored information is reused when leaving the idle mode, and a semi-connected mode, in which information relating to a radio connection via the first radio resource is stored and the first transceiver is periodically deactivated and activated, wherein the stored information is reused when activating the first transceiver.

11. A terminal device for use in a cellular mobile communication network, the cellular mobile communication network comprising at least one first base station using a first radio resource and at least one second base station using a second radio resource, the terminal device comprising:

a first transceiver for communicating via the first radio resource, a second transceiver for communicating via the second radio resource, and a processor configured to:

receive, via the first transceiver, a radio resource control information determined for the second radio resource, establish, via the second transceiver, a user data communication between the second base station and the terminal device as defined by the radio resource control information, set the first transceiver in an idle mode subsequent to at least receiving the radio resource control information, determine a state of a radio transmission between the second base station and terminal device wherein to determine the state of the radio transmission the processor is further configured to at least one of:

determine a quality information relating to the radio transmission between the second base station and terminal device, and determine a mobility event of the terminal device, and set the first transceiver in an active mode depending on the state of the radio transmission between the second base station and terminal device.

* * * * *